US012674351B2

(12) United States Patent
Kang et al.

(10) Patent No.: US 12,674,351 B2
(45) Date of Patent: Jul. 7, 2026

(54) SMART VEHICLE DOOR OPENING AND RELATED METHODS

(71) Applicant: TOYOTA MOTOR ENGINEERING & MANUFACTURING NORTH AMERICA, INC., Plano, TX (US)

(72) Inventors: Te-Ping Kang, Milford, MI (US); Bensingh Beno, Farmington Hills, MI (US); John Rafferty, Dexter, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 137 days.

(21) Appl. No.: 18/592,837

(22) Filed: Mar. 1, 2024

(65) Prior Publication Data

US 2025/0277399 A1      Sep. 4, 2025

(51) Int. Cl.
| | |
|---|---|
| *E05F 15/73* | (2015.01) |
| *G06V 10/75* | (2022.01) |
| *G06V 40/12* | (2022.01) |
| *G06V 40/16* | (2022.01) |
| *G06V 40/18* | (2022.01) |
| *G06V 40/20* | (2022.01) |

(52) U.S. Cl.
CPC ............ *E05F 15/73* (2015.01); *G06V 10/751* (2022.01); *G06V 40/20* (2022.01); *E05F 2015/767* (2015.01); *E05Y 2400/8505* (2024.05); *E05Y 2400/858* (2013.01); *E05Y*

*2900/531* (2013.01); *G06V 40/1365* (2022.01); *G06V 40/172* (2022.01); *G06V 40/197* (2022.01)

(58) Field of Classification Search
CPC .................................................. E05Y 2400/858
See application file for complete search history.

(56) References Cited

U.S. PATENT DOCUMENTS

| | | | |
|---|---|---|---|
| 9,205,806 | B2 | 12/2015 | Günter |
| 10,227,813 | B2 | 3/2019 | Ryu et al. |
| 10,443,287 | B2 * | 10/2019 | Elie .......................... G01D 5/26 |
| 2008/0129446 | A1 | 6/2008 | Vader |
| 2017/0167180 | A1 | 6/2017 | Bingle et al. |
| 2020/0238952 | A1 * | 7/2020 | Lindsay ............... G06V 30/194 |
| 2021/0370882 | A1 * | 12/2021 | Morosawa ............ B60R 25/305 |
| 2022/0348164 | A1 * | 11/2022 | Manickam .............. B60R 25/01 |

FOREIGN PATENT DOCUMENTS

| | | | | |
|---|---|---|---|---|
| DE | 10341691 | A1 | 3/2005 | |
| JP | 2022128931 | A * | 9/2022 | ............. B60R 25/25 |

* cited by examiner

*Primary Examiner* — Christian Chace
*Assistant Examiner* — Minato Lee Horner
(74) *Attorney, Agent, or Firm* — HAYNES AND BOONE, LLP

(57) ABSTRACT

The touchless opening or closing of a vehicle door using a camera to assist in detection of a user's predefined actions is disclosed. A user approaches a vehicle and, once in proximity to the vehicle, is detected. The system authenticates the user and identifies a predefined action of the user using a vehicle camera. Once the predefined action is identified, the vehicle door is opened or closed.

16 Claims, 6 Drawing Sheets

Figure 2:
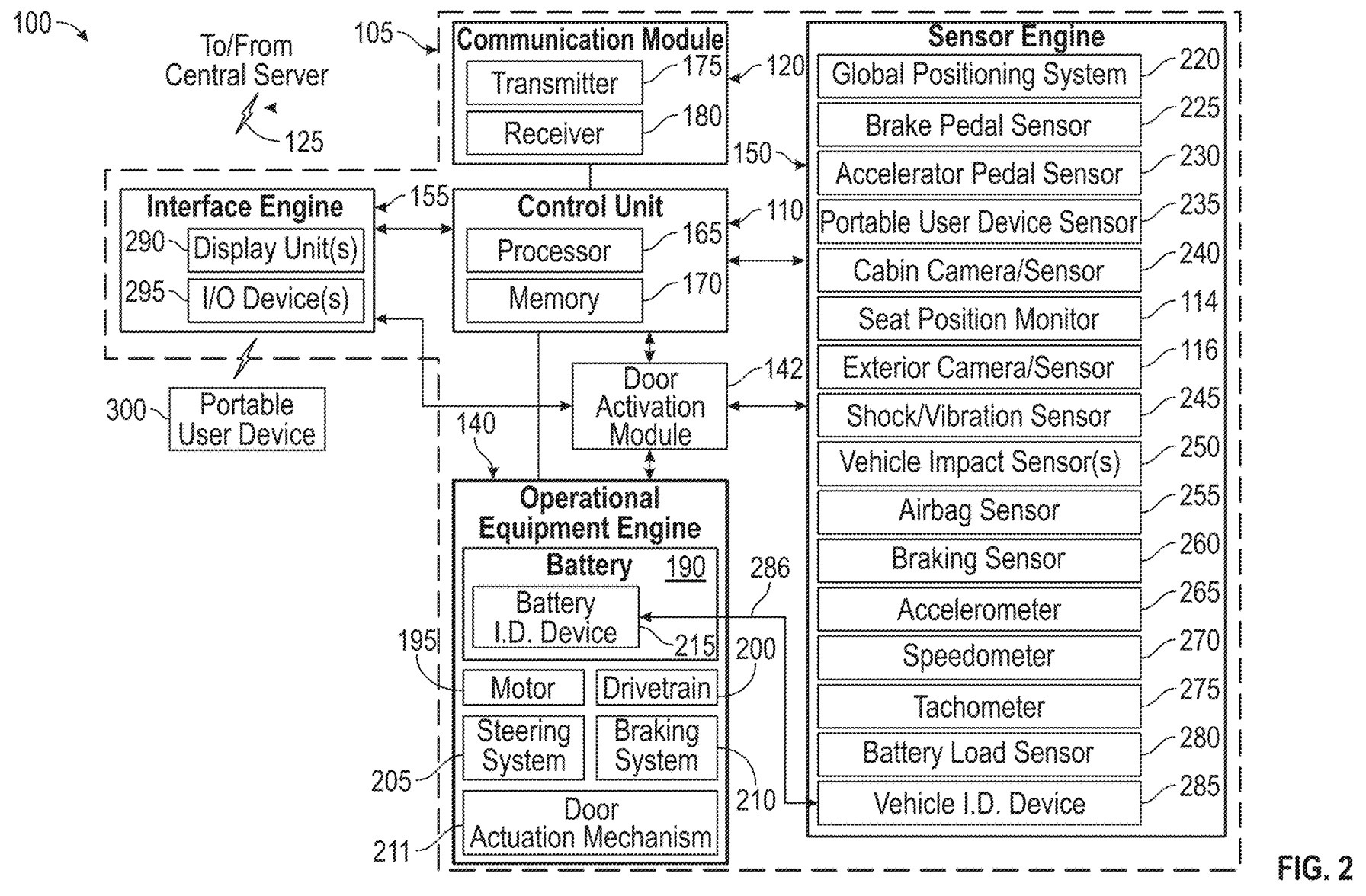

To/From Central Server — 125

Communication Module — 120
- Transmitter — 175
- Receiver — 180

150

Control Unit — 110
- Processor — 165
- Memory — 170

155

Interface Engine
- Display Unit(s) — 290
- I/O Device(s) — 295

Portable User Device — 300

105

142
Door Activation Module

140

Operational Equipment Engine
- Battery 190
  - Battery I.D. Device — 215
- Motor — 195
- Drivetrain — 286
- Steering System — 205
- Braking System — 200
- Door Actuation Mechanism — 211

210

Sensor Engine
- Global Positioning System — 220
- Brake Pedal Sensor — 225
- Accelerator Pedal Sensor — 230
- Portable User Device Sensor — 235
- Cabin Camera/Sensor — 240
- Seat Position Monitor — 114
- Exterior Camera/Sensor — 116
- Shock/Vibration Sensor — 245
- Vehicle Impact Sensor(s) — 250
- Airbag Sensor — 255
- Braking Sensor — 260
- Accelerometer — 265
- Speedometer — 270
- Tachometer — 275
- Battery Load Sensor — 280
- Vehicle I.D. Device — 285

400

402
A system constantly scans surrounding

404
Vehicle recognizes the driver ?
No

Yes

406
System wake up the camera system and search for action

408
Driver perform a matched action or gesture ?
No

Yes

410
Confirm the matched pattern

412
Is surrounding is clear without obstruction ?
No

Yes

414
Open door

600

650

Processor Circuit

660

Processor

664

Memory

666

Instructions

668

Communication Module

SMART VEHICLE DOOR OPENING AND RELATED METHODS

TECHNICAL FIELD

The subject matter described herein relates generally to touchless vehicle door opening/closing and, more particularly, to systems and methods for activating vehicle doors using the predefined actions of a user observed through a vehicle camera.

BACKGROUND

Touchless vehicle access methods allow users to open vehicle doors in a variety of ways. Such access techniques include standing near the rear bumper and performing a kick motion. However, when a user has an oversized item, it is difficult to reach the kick sensor underneath the bumper. Also, when a user holds a heavy item or is wearing high-heels, it can be challenging to balance him/her-self with only one foot. Further, locating the right location to kick is also difficult.

SUMMARY

The various embodiments described herein provide a solution for touchless activation (opening or closing) of a vehicle door. A general embodiment of the present disclosure provides a system including a camera positioned on the vehicle and a processor communicably coupled to that processor. The processor includes a memory and is configured to perform operations comprising: detecting a presence of a user within a vicinity of the vehicle; authenticating the user; identifying, using a vehicle camera, a predefined action of the authenticated user; and in response to the identification, activating the door of the vehicle.

An alternative general embodiment of the present disclosure provides a computer-implemented method for activating a door of a vehicle. In the method, the presence of the user in the vicinity of the vehicle is detected. Processing circuitry is then used to authenticate the user, identify a predefined action of the authenticated user via a vehicle camera, and then, in response to the identification, activating the door of the vehicle.

In yet another generalized embodiment, a computer-implemented method for activating a door of a vehicle is provided. The method includes first, detecting the presence of a user within a vicinity of the vehicle. Thereafter, a camera is used to identify a predefined action of the user. In response to the identification, the system then activates the vehicle door.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 2 is a diagrammatic illustration, in a block-diagram form, of at least a portion of the vehicle door activating system of FIG. 1, in accordance with at least one embodiment of the present disclosure.

DETAILED DESCRIPTION

Figure 1:
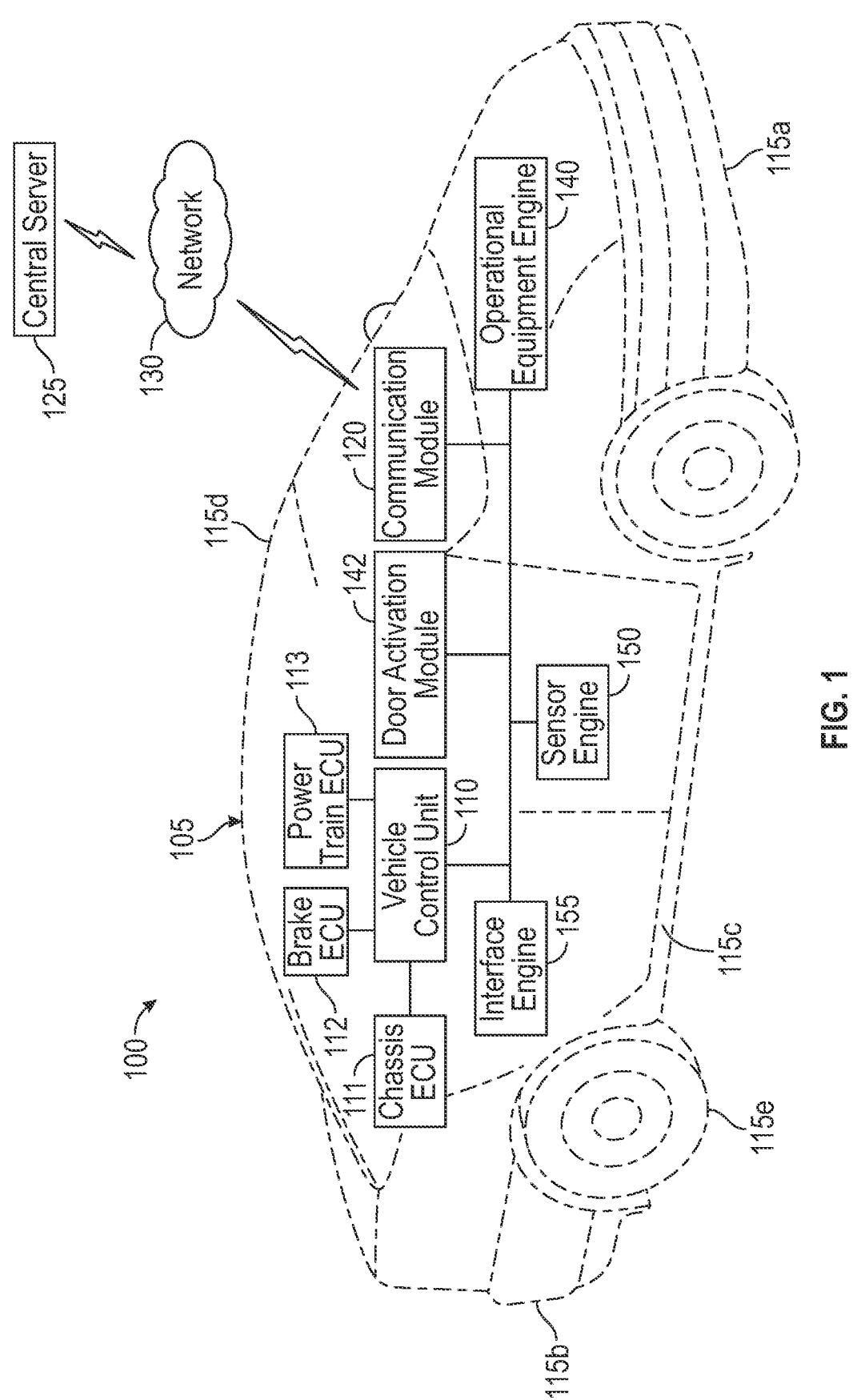
FIG. 1 is a diagrammatic illustration of a vehicle door activating system in accordance with at least one embodiment of the present disclosure.

The present disclosure is generally directed to touchless opening or closing of a vehicle door using a camera to assist in detection of a user's predefined actions. A user (e.g., driver or other passenger) may approach a vehicle and, once in proximity to the vehicle, be detected. The system then authenticates the user using a variety of techniques including, for example, facial, voice, body, retina or palm recognition, as well as through detection of a wearable device, presence of mobile device, key fob or some other device having a unique identifier. Once authenticated, the system identifies a predefined action of the user via the camera. The predefined action, for example, may be a certain posture or gesture of the authenticated user. Once the predefined action is identified, the vehicle door is opened or closed. The vehicle door may be any vehicle opening such as, for example, side doors, sliding doors, hoods, trunks, lift gates, truck beds, or a truck bed door latch.

The vehicle door activation system described herein may be implemented as a process at least partially implemented on a display, and operated by a control process executing on a processor that accepts user inputs from a suitable user-interface and other control devices, and that is in communication with one or more vehicle cameras and sensors. In that regard, the control process performs certain specific operations in response to different inputs or selections made at different times, and/or in response to real-time or near-real-time camera or sensor readings.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes, and should not be considered to limit the scope of the vehicle door activation system described herein. Certain features may be added, removed, or modified without departing from the spirit of the claimed subject matter.

FIG. 1 is a diagrammatic illustration of a vehicle door activating system in accordance with at least one embodiment of the present disclosure. In an example, a vehicle door activating system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115c.

A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110 and door activation module 142 which is utilized to perform the methods described herein. A sensor engine 150 is operably coupled to, and adapted to be in communication with, the vehicle control unit 110. The sensor engine 150 is adapted to monitor various components of, for example, the operational equipment engine 140 and one or more cameras on the vehicle (not shown), as will be described in further detail below.

An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle door activating system 100.

The term "engine" is meant herein to refer to an agent, instrument, or combination of either, or both, agents and instruments that may be associated to serve a purpose or accomplish a task-agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor 195 and drivetrain 200, and sensor engine 150.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

FIG. 2 is a diagrammatic illustration, in a block-diagram form, of at least a portion of the vehicle door activating system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, a braking system 210, and one or more door actuation mechanism(s) 211. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215.

The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110, includes devices such as sensors, cameras, meters, detectors, or other devices configured to measure or sense a parameter related to a driving operation of the vehicle 105 or the position of a user entering or exiting vehicle 105. For example, the sensor engine 150 may include a global positioning system 220 that can be used to determine road grade, a brake pedal sensor 225, an accelerator pedal sensor 230, a portable user device sensor 235 that can be used to determine when a certain driver or user is in the vicinity or inside vehicle 105, a cabin camera/ sensor 240 used to monitor the position of persons within vehicle 105, a seat position monitor 114 used to control and monitor the position of the vehicle seats, a shock/vibration sensor 245, a vehicle impact sensor 250, an airbag sensor 255, a braking sensor 260, an accelerometer 265 (which may in some cases also serve as an inclinometer), a speedometer 270, a tachometer 275, a battery load sensor 280, a vehicle identification device 285, one or more exterior cameras or sensors 116 that can be used to monitor exterior traffic and/or weather conditions around the vehicle or to determine when vehicle 105 approaches a parking space, or any combinations thereof. In some instances, traffic or weather patterns may be monitored from outside the vehicle and received from a server via a network.

In certain embodiments of the present disclosure, vehicle door activating system 100 includes one or more exterior cameras/sensors 116. Such cameras 116 may be located on the rear of the vehicle near the rear liftgate, trunk or truck bed door latch. In yet other embodiments, the camera 116 may be positioned on side mirrors, any exterior wall around the truck bed, door panels, front or rear bumper, etc.

Further, the sensors or other detection devices 116 may be configured to sense or detect activity, conditions, and circumstances in an area to which the device has access, e.g., ambient conditions, conditions within the vehicle cabin, etc. Sub-components of the sensor engine 150 may be deployed at any operational area where information on the driving of the vehicle 105 may occur. Some readings from the sensor engine 150 may be fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265, and may also serve as an inclinometer or tilt sensor. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110, door activation module 142, and the functions that the vehicle control unit 110 provides. Thus, in certain embodiments, the user captures (via one or more cameras 116) certain predefined actions such as postures or gestures. Alternatively, these predefined actions could also be captured by some remote user device, such as a smartphone, whereby the captured images are then communicated to vehicle control unit 110 via network 130 or some other nearfield communication network. The postures may be any variety of postures/poses the user selects, as well as the gestures may be any variety of gestures a user may select. Nevertheless, once these predefined actions are captured by a camera 116, the resultant images are then uploaded and stored by vehicle control unit 110.

The predefined action images may be assigned to certain user profiles, which may also be created via interface engine 155. For example, the interface engine 155 may include a display unit 290 and an input/output ("I/O") device 295 through which the user can access their user profile(s) to assign predefined actions accordingly. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

As previously mentioned, in some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, key fobs, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

With further reference to FIG. 2, the vehicle door activating system 100 also includes a door activation module 142, the operation of which will be described below. In some embodiments, the door activation module 42 is communicably coupled to one or more exterior cameras 116, door actuation mechanism 211 (via operational equipment engine 140), and may also include its own processor and memory. Door actuation mechanism 211 is the hinge mechanism that opens or closes the desired vehicle door. As described herein, the door activation module 142 enables the automatic activation of the vehicle door once a user has been authorized and the required predefined action has been observed via the camera 116. To achieve this, the door activation module 142 is in communication with one or more of the sensor engine 150, VCU 110, operational equipment engine 140, or interface engine 155.

A reader of ordinary skill in the art will understand that other components or arrangements of components may be found in a vehicle 105, and that may of the same general principles apply to electric vehicles, internal combustion vehicles, and hybrid vehicles.

Figure 3:
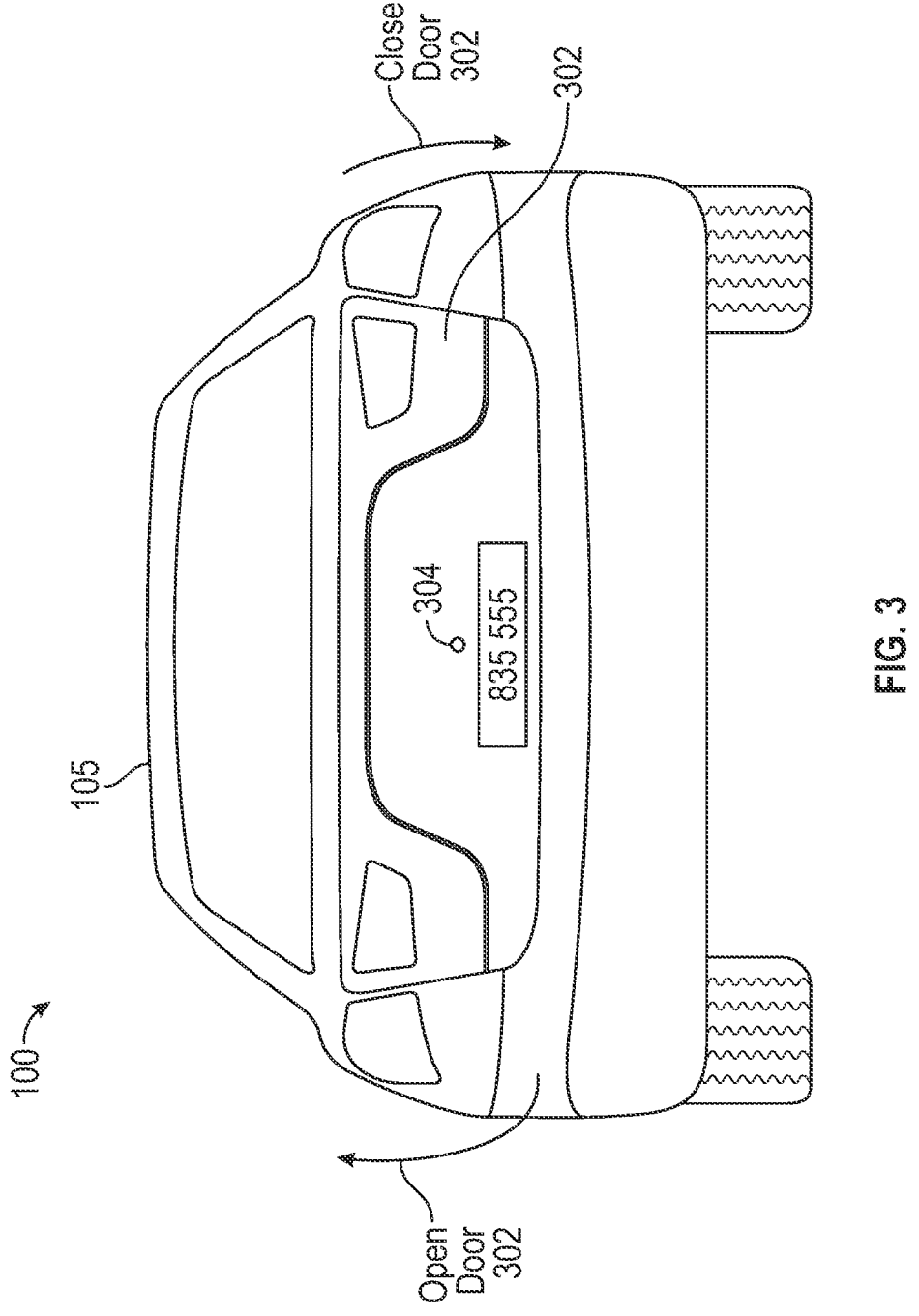
FIG. 3 is a representation of the rear of a vehicle, in accordance with at least one embodiment of the present disclosure.

FIG. 3 is a representation of the rear of vehicle 105, in accordance with at least one embodiment of the present disclosure. The rear of vehicle 105 includes a door 302 (e.g., trunk or liftgate) having a camera 304 thereon. Although not shown, camera 304 is communicably coupled to sensor engine 150, interface engine 155, vehicle control unit 110 and door activation module 142.

As one or more user(s) approach vehicle 105 and comes within the view of camera 304, vehicle door activating system 100 is activated and vehicle control unit 110 begins analyzing the image data received from camera 304. The vehicle control unit 110 begins the process of authenticating the one or more users. The authentication process can take a variety of forms. For example, vehicle door activating system 100 may use facial recognition techniques. Here, the system may compare the image data with a facial image that has been pre-paired to an authenticated user profile. In yet other embodiments, vehicle door activating system 100 may use retina or palm recognition. Here, the system may compare image data of the user's retina or palm to retina/palm images that have been pre-paired to an authenticated user profile. In yet other embodiments, vehicle door activating system 100 may use a technique to identify the user's body size or height and compare that to pre-paired image data saved to an authenticated user profile.

In other illustrative embodiments, vehicle door activating system 100 may apply voice recognition techniques to authenticate the user. In such embodiments, once vehicle door activating system 100 is activated in response to the user coming into the view of the camera 304, the user can speak a command or simply speak. In response, vehicle door activating system 100 detects the voice via a microphone (not shown) and compares the voice signature to a voice signature pre-paired to an authenticated user profile. In certain embodiments, vehicle door activating system 100 passively listens for an authenticated voice signature, while in other embodiments the user can speak some affirmative command that has been pre-paired to their profile. In the latter, a key word can be spoken which results in user authentication. Such a key word can be chosen by the user and pre-paired to their profile.

In situations where multiple persons approach vehicle 105, vehicle door activating system 100 activates in response to the image data received from camera 304. Vehicle door activating system 100 then processes the image data of each individual, and thereafter authenticates one or more of the individuals based on the pre-paired authenticated profiles. In alternative embodiments, vehicle door activating system 100 activates and again processes the image data of each individual, but only authenticates a pre-defined maximum number of the individuals and rejects the remaining individuals. In certain embodiments, the maximum number of authenticated persons may be pre-set by some authenticated user via interface engine 155.

Once one or more users have been authenticated by vehicle door activating system 100, camera 304 continues to collect the image data of the authenticated user(s). Once the authenticated user desires to open door 302, the user performs some predefined action in the view of camera 304. Such predefined action may be a variety of actions including, for example, a posture or gesture. The posture may be a salute pose, for example, or any other pose the user desires. The user may pre-pair the posture to his or her user profile via interface engine 155 by, for example, standing in front of camera 304 and performing the action (e.g., posture, gesture, etc) while vehicle door activating system 100 is in a learning mode (i.e., teaching vehicle door activating system 100). Vehicle door activating system 100 then learns the posture and pairs it to the user's profile. These and other similar learning methods can be used to teach vehicle door activating system 100 various poses or gestures to be pre-paired to user profiles.

Likewise, in yet other illustrative embodiments, a user's profile can be pre-paired to a gesture. For example, the gesture can be an arm movement, hand movement, leg movement, etc. Camera 304 will obtain the image data of the gesture, then communicate it to vehicle control unit 110 whereby the image (and pattern) data is compared to the pre-paired gesture.

Thereafter, once vehicle door activating system 100 detects a match between the authenticated user's action and the pre-paired action, vehicle control unit 110 then communicates with door activation module 142 to open or close door 302.

The methods described herein can be likewise applied to any door of vehicle 105. Such doors may be, for example, liftgates, hoods, rear or front trunks, sliding doors, truck beds or truck bed door latches. In such embodiments, one or more cameras may be located on the sides, roofs, front, rear, etc of vehicle 105 in order to capture the image data necessary to authenticate and activate the system accordingly.

In the embodiments described herein, the user can access the hands-free door opening without getting too close to the vehicle. The systems described herein allows any variety of gestures, such as a stomp or standing pose in a designated area within view of the camera in order to activate a desired door. Certain actions may be pre-paired to certain doors of the vehicle or one action may activate all doors, or the door in which the user is in closets proximity. The system is especially useful for certain impaired users which may not be able to kick or perform other actions. In such cases, the impaired user can teach the system actions he or she can perform and, thereby, open or close doors of the vehicle. Systems of the present disclosure can utilize existing cameras only to save cost or the system can be built with additional cameras.

Figure 4:
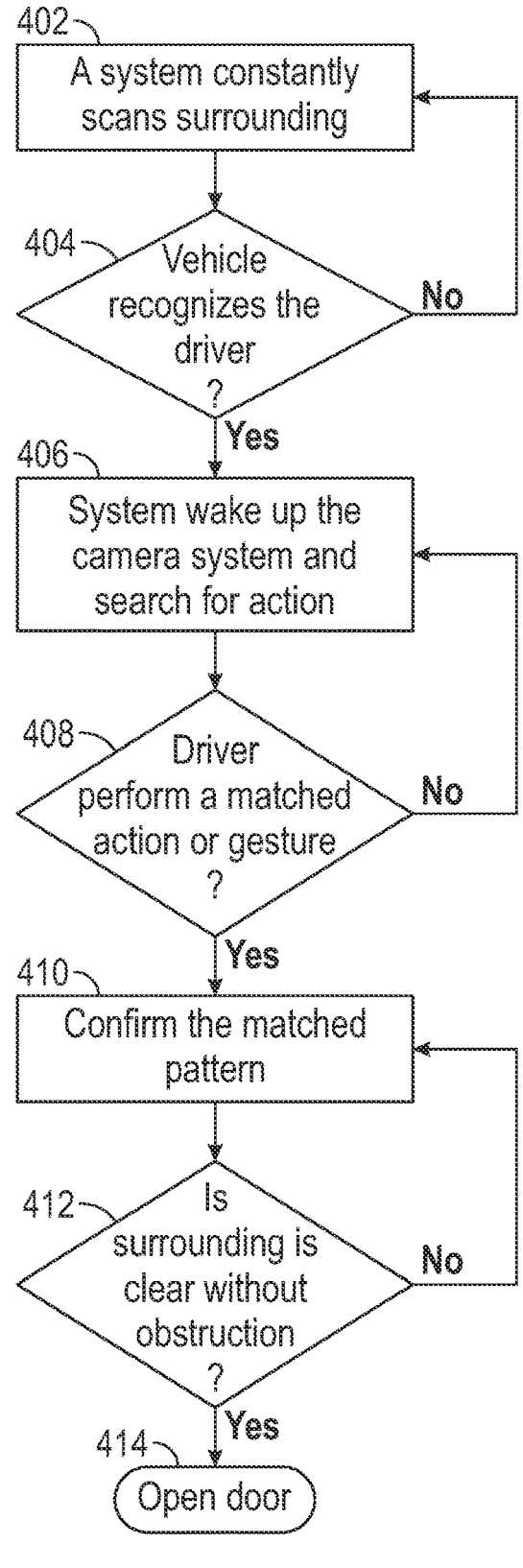
FIG. 4 is a flow chart of a more detailed method to actuate a vehicle door, according to certain illustrative embodiments of the present disclosure.

FIG. 4 is a flow chart of a more detailed method to actuate a vehicle door, according to certain illustrative embodiments of the present disclosure. In method 400, vehicle door activating system 100 constantly scans image data received from one or more cameras 304, at block 402. Alternatively, vehicle door activating system 100 can be passive and use key fob recognition, or a geo-fencing application, or the user can actively awake vehicle door activating system 100 by clicking a key fob. In those methods utilizing a key fob to wake vehicle door activating system 100, Bluetooth may be utilized to detect the presence and identity of the user. Alternatively, vehicle door activating system 100 can be an active system (as described in block 402) that, via camera 304, constantly scans the viewing area for authenticated users (e.g., a driver's face), receives sensor readings from a nearby object, or listens for voice activation/recognition. Nearby objects could include, for example, a bar code or QR code, or recognition of an object the vehicle has been trained to respond to (e.g., user's briefcase, clothing, uniform or some other adornment).

At block 404, vehicle door activating system 100 recognizes the user through any suitable method described herein (e.g., key fob). If a pre-authenticated user is not recognized, the method continues to scan the image data. If a pre-authenticated user is recognized by vehicle door activating system 100, the system "wakes up" camera 304 and begins searching for action, at block 406. At block 408, vehicle door activating system 100 determines if the user performs a predefined action (e.g., gesture or posture). Here, vehicle door activating system 100 scans for an action that matches a set (or one) of a pre-paired action, such as a kicking motion, stomping motion, stance in a designated area for a few seconds, hand gesture (e.g., waving or pointing the vehicle or some part of the vehicle), etc. If vehicle door activating system 100 does not identify the pre-paired action, the system continues to search image data for the pre-paired action.

If vehicle door activating system 100 confirms the predefined action at block 410, the method proceeds to block 412 to determine if the area surrounding the door is clear from obstruction. To do so, vehicle door activating system 100 may employ any variety of sensors to determine if an obstruction is present. Here, vehicle 105 will look for a possible obstruction in the camera view and avoid that hazard, such as a driver too close to the door or clearance that tis too low to open the door. Once it is determined an obstruction is not present, vehicle door activating system 100 opens or closes the door.

It is noted that flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, in order to actuate a door in real time, the vehicle door activating system 100 may need to execute multiple times per second (e.g., a rate of 10 Hz, 20 Hz, etc.).

Figure 5:
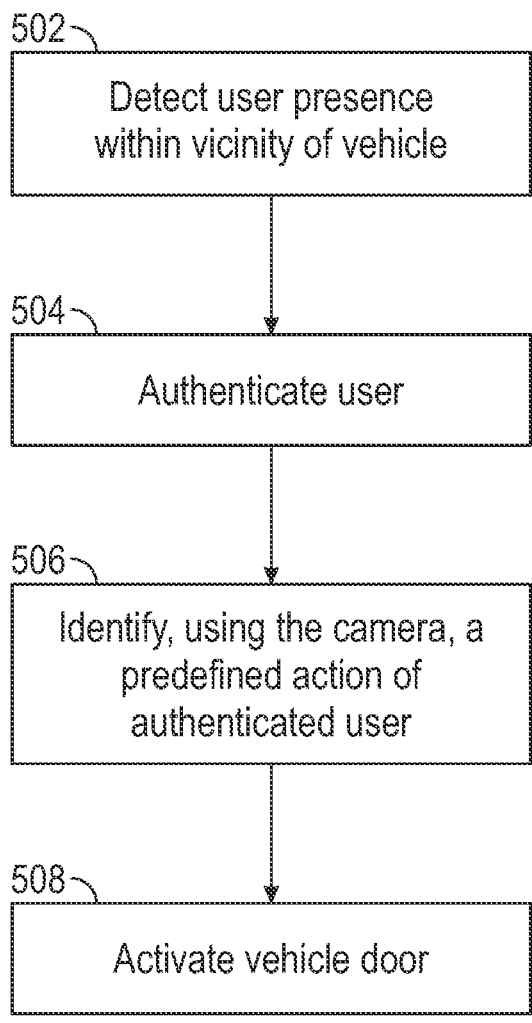
FIG. 5 is a flow diagram of the method to activate a vehicle door, according to illustrative embodiments of the present disclosure.

FIG. 5 is a flow diagram of the method to activate a vehicle door, according to illustrative embodiments of the present disclosure. A described herein in one example, vehicle door activating system 100 is communicably coupled to vehicle control unit 110 and door activation module 142, which contains a processor, memory and the various other components described herein. At block 502 of method 500, vehicle door activating system 100 detects the present of a user within the vicinity of vehicle 105. Such detection may be achieved via a number of active or passive methods such as, for example, through use of one or more cameras, key fobs or other sensors. At block 504, vehicle door activating system 100 authenticates the user via one of the techniques described herein. Once the user is authenticated by vehicle door activating system 100, the system then identifies, using one or more cameras, a predefined action of the authenticated user, at block 506. At block 508, vehicle door activating system 100 then activates the vehicle door.

Figure 6:
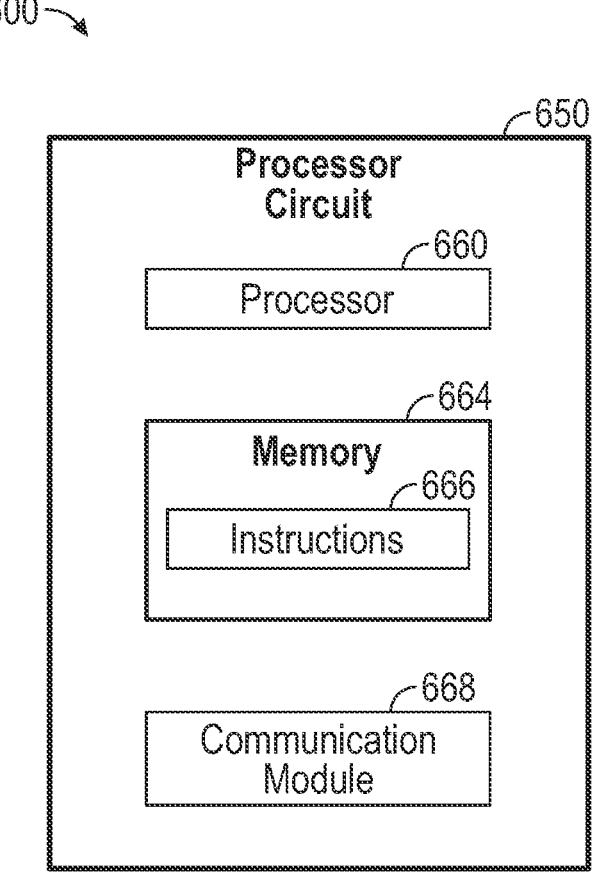
FIG. 6 is a schematic diagram of a processor circuit, in accordance with certain illustrative embodiments of the present disclosure.

FIG. 6 is a schematic diagram of a processor circuit 650, in accordance with at least one embodiment of the present disclosure. The processor circuit 650 may be implemented in the system 100, or other devices or workstations (e.g., third-party workstations, network routers, etc.), or on a cloud processor or other remote processing unit, as necessary to implement the methods described herein. As shown, the processor circuit 650 may include a processor 660, a memory 664 having instructions 666 thereon, and a communication module 668. These elements may be in direct or indirect communication with each other, for example via one or more buses.

The processor 660 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 660 may also comprise another hardware device, a firmware device, or any combination thereof configured to perform the operations described herein. The processor 660 may also be implemented as a combination of computing devices, e.g., a combination of a DSP and a microprocessor, a plurality of microprocessors, one or more microprocessors in conjunction with a DSP core, or any other such configuration.

The memory 664 may include a cache memory (e.g., a cache memory of the processor 660), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 664 includes a non-transitory computer-readable medium. The memory 664 may store instructions 666. The instructions 666 may include instructions that, when executed by the processor 560, cause the processor 660 to perform the operations described herein. Instructions 666 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 668 can include any electronic circuitry and/or logic circuitry to facilitate direct or indirect communication of data between the processor circuit 650, and other processors or devices. In that regard, the communication module 668 can be an input/output (I/O) device. In some instances, the communication module 668 facilitates direct or indirect communication between various elements of the processor circuit 650 and/or the system 100. The communication module 668 may communicate within the processor circuit 650 through numerous methods or protocols. Serial communication protocols may include but are not limited to United States Serial Protocol Interface (US SPI), Inter-Integrated Circuit (I2C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or readings from vehicle or environmental sensors) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

The technology described herein may be implemented on manually controlled vehicles or driver-assist vehicles. The technology may be implemented in diverse combinations of hardware, software, and firmware, depending on the implementation or as necessitated by the structures and modules already present in existing vehicles. The system may be employed on vehicles with automatic transmission, manual transmissions, or vehicles with simulated shifting, including continuously variable transmission (CVT), infinitely variable transmission (IVT), hybrid transmissions (e.g., a hybrid vehicle with 4-speed automatic transmission simulating 10 gears), and fully electric vehicles.

Accordingly, the logical operations making up the embodiments of the technology described herein may be referred to variously as operations, steps, blocks, objects, elements, components, or modules. Furthermore, it should be understood that these may occur or be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the cargo seat adjustment system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the vehicle door activating system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for activating a door of a vehicle, the system comprising:

a camera positioned on the vehicle; and a processor comprising a memory and configured to perform operations comprising:

detecting a presence of a user within a vicinity of the vehicle;

authenticating, using the camera, a pre-defined maximum number of users greater than one in a field of view of the camera while rejecting any other persons;

identifying, using the camera, a predefined action of at least one of the authenticated users; and in response to the identification, activating the door of the vehicle.

2. The system of claim 1, wherein activating the door comprises:

determining, using one or more sensors, whether an area surrounding the door is clear from obstruction; and if the area is clear, then activating the door of the vehicle.

3. The system of claim 1, wherein the system was taught the predefined action by the authenticated users.

4. The system of claim 1, wherein authenticating the users comprises:

using facial recognition, via the camera, to match the users with a pre-paired facial image; or using retina or palm recognition, via the camera, to authenticate the users.

5. The system of claim 1, wherein authenticating the users comprises verifying, via the camera, the user through recognition of a body size, height and face of the users.

6. The system of claim 1, wherein voice recognition is used to authenticate the users.

7. The system of claim 6, wherein a key word is given by the users to achieve authentication.

8. A computer-implemented method for activating a door of a vehicle, the method comprising:

detecting a presence of a user within a vicinity of the vehicle;

authenticating, using the camera, a pre-defined maximum number of users greater than one in a field of view of the camera while rejecting any other persons;

identifying, using a camera positioned on the vehicle, a predefined action of at least one of the authenticated users; and in response to the identification, activating the door of the vehicle.

9. The method of claim 8, wherein activating the door comprises:

determining, using one or more sensors, whether an area surrounding the door is clear from obstruction; and if the area is clear, then activating the door of the vehicle.

10. The method of claim 8, wherein the system was taught the predefined action by the authenticated users.

11. The method of claim 8, wherein authenticating the user comprises:

using facial recognition, via the camera, to match the users with a pre-paired facial image; or using retina or palm recognition, via the camera, to authenticate the users.

12. The method of claim 8, wherein authenticating the users comprises verifying, via the camera, the user through recognition of a body size, height and face of the users.

13. The method of claim 8, wherein voice recognition is used to authenticate the users.

14. The method of claim 13, wherein a key word is given by the users to achieve authentication.

15. A computer-implemented method for activating a door of a vehicle, the method comprising:

detecting a presence of multiple users within a vicinity of the vehicle, wherein two or more of the users are authenticated while any other persons are rejected;

identifying, using a camera positioned on the vehicle, a predefined action of at least one of the users; and in response to the identification, activating the door of the vehicle.

16. The method of claim 15, wherein activating the door comprises:

determining, using one or more sensors, whether an area surrounding the door is clear from obstruction; and if the area is clear, then activating the door of the vehicle.

* * * * *